June 17, 1958  O. W. AKERSON  2,838,902
WINDROW EDGE ALIGNER

Filed May 21, 1956  2 Sheets-Sheet 2

INVENTOR.
O. W. Akerson
BY Arthur H. Sturges,
Attorney

United States Patent Office 2,838,902
Patented June 17, 1958

2,838,902

WINDROW EDGE ALIGNER

Oscar W. Akerson, Webster, S. Dak.

Application May 21, 1956, Serial No. 586,027

3 Claims. (Cl. 56—189)

This invention relates to farm machinery and equipment particularly of the type used in curing and harvesting hay, and similar products, and in particular an attachment for a windrower wherein hay dropping between the cutter or cycle bar and the windrower conveyor belt and which results in "dribble" or "scattering" along the edge of the windrow, is carried by screw conveyors to the windrow, reducing waste, and assisting in the alignment of the windrow.

The purpose of this invention is to provide an attachment for a windrower whereby waste material dropping between the cutter bar and conveyor belt is recovered and the alignment of the windrow maintained.

In some types of windrowers and particularly in windrowers having a conveyor belt positioned behind the cutter bar portions of the swathe drop in space between the cutter bar and conveyor belt leaving a "dribble" or "scattering" along one edge of the windrow. This "dribble" or "scattering" is difficult to pick up or recover with a conventional harvester, baler, or other equipment following the windrower, and, consequently, results in considerable waste.

With this thought in mind this invention contemplates a frame positioned in the structure of a windrower with a pair of screw conveyors rotatably mounted in the frame and extended toward the conveyor belt and transmission elements operatively connecting the screw conveyors to a traction wheel of the windrower, whereby the screw conveyors, actuated by the traction wheel, carry products dropping between the cutter bar and belt of the conveyor to the windrow.

The object of this invention is, therefore, to provide conveying means adapted to be installed in the structure of a windrower whereby parts of the swathe dropping between the cutter bar and conveyor belt are carried to the windrower.

Another object of the invention is to provide a device for aligning edges of windrows in which the device is adapted to be attached to the machine forming the windrows.

Another important object of the invention is to provide a windrow aligning attachment for a windrower in which the device is adapted to be operated by a traction wheel of the windrower.

It is yet another object of the invention to provide an aligning attachment for a windrower in which the attachment is adapted to be installed on windrowers now in use.

A further object of the invention is to provide an aligning attachment for a windrower which recovers material dropping through the area between the cutter bar and belt conveyor and places said material in alignment on a windrow formed by the machine to facilitate picking up the material by a following implement and to reduce waste to a minimum.

A still further object of the invention is to provide an aligning attachment for a windrower in which the attachment is of a simple and economical construction.

With these and other objects and advantages in view the invention embodies a mounting frame adapted to be incorporated in the structure of a windrower, a pair of screw conveyors rotatably mounted in the frame and extended from one end thereof, a counter-shaft rotatably mounted in the windrower structure, and suitable belts, pulleys, sprockets, and chains operatively connecting a traction wheel of the windrower to the screw conveyors.

Other features and advantages of the invention will appear from the following description taken in connection with the drawings, wherein.

Figure 1:
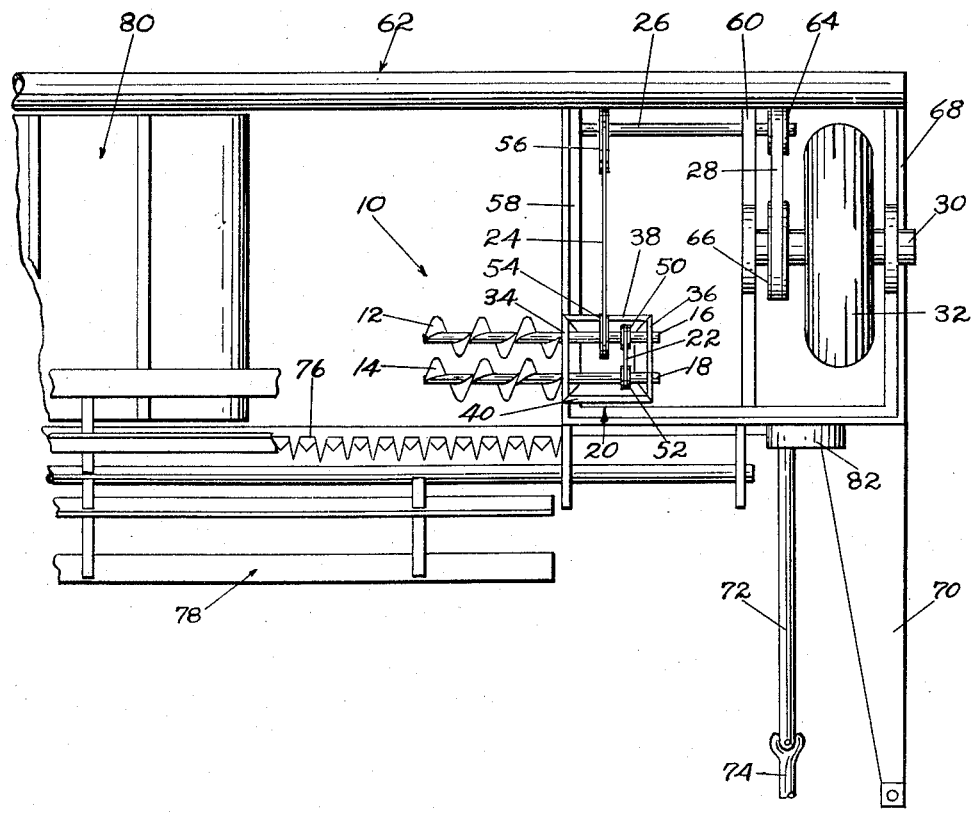
Figure 1 is a plan view showing a portion of a windrower showing a pair of screw conveyors with operating means therefor incorporated therein.
Figure 2:
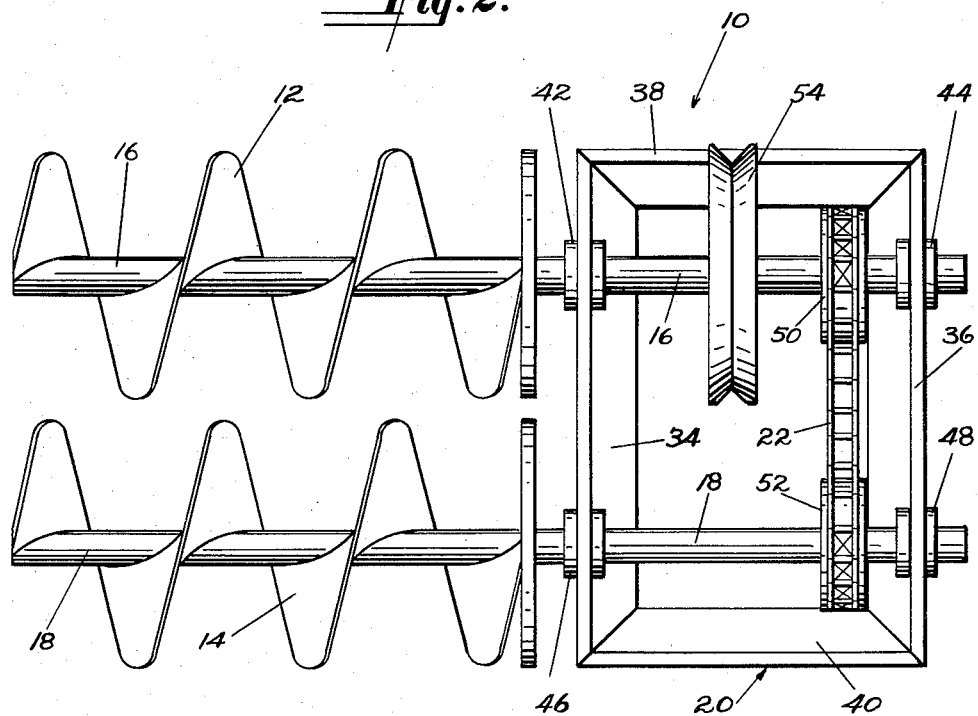
Figure 2 is a similar view showing the screw conveyors and mounting elements thereof with the parts shown on an enlarged scale.
Figure 3:
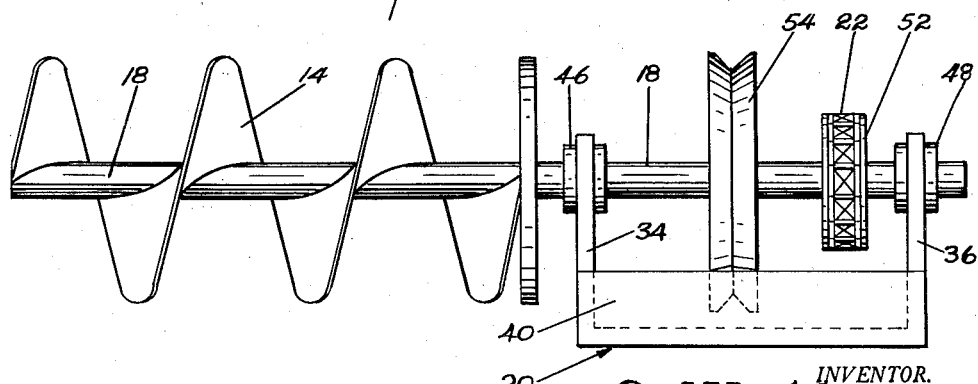
Figure 3 is a front elevational view of the screw conveyor assembly shown in Figure 2.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 sections of screw conveyors carried by shafts 16 and 18, respectively, numeral 20 a mounting frame in which the shafts of the screw conveyors are mounted, numeral 22 a chain for driving one of the screw conveyors from the other, numeral 24 a V-belt or chain for driving the screw conveyors from a counter-shaft 26, and numeral 28 a chain or belt for driving the counter-shaft from the shaft 30 of a traction wheel 32 of the windrower.

The mounting frame includes angle bars 34 and 36 at the ends and 38 and 40 at the sides, and the shaft 16 is rotatably mounted in the angle bars 34 and 36 with bearings 42 and 44. The shaft 18 is also mounted in the angle bars 34 and 36 with bearings 46 and 48. The shafts 16 and 18 are provided with sprockets 50 and 52 over which the chain 22 is trained and the shaft 16 is provided with a pulley or sprocket 54 through which the screw conveyors are driven from the counter-shaft 26 by the belt or chain 24, one end of the belt or chain being trained over the pulley or sprocket 54 and the other over a pulley or sprocket 56 on the counter-shaft. The counter-shaft 26 is rotatably mounted in cross bars 58 and 60 of the windrower frame 62 and a pulley or sprocket 64 on the shaft is aligned with a pulley or sprocket 66 on the axle 30 of the traction wheel 32, whereby with the chain or belt 28 trained over the pulleys or sprockets 64 and 66 the screw conveyors are actuated by the traction wheel.

The windrower frame is provided with an end bar 68 and the shaft or axle 30 of the traction wheel is rotatably mounted in the bars 60 and 68. The end of the frame is also provided with a drawing or tow bar 70 and a shaft 72 that is adapted to be connected to the power take-off 74 of a towing tractor. The frame is also provided with a cutter bar 76, a reel 78, a belt conveyor 80, and a pitman 82 for actuating the cutter bar.

Operation

With the screw conveyors and transmission elements installed as illustrated and described grain or other products cut by the cutter bar drop behind the cutter bar with most of the products dropping on the belt conveyor, however, some of the products drop in the space between the cutter bar and belt conveyor, and these products are carried by the two screw conveyors to the windrow with the grain or other products being deposited upon the windrow by the belt conveyor. By this means substantially all "dribble" and "scatterings" are eliminated and aligned windrows are obtained.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

1. In a windrow edge aligner, the combination which comprises a frame, rectangular-shaped in plan having side and end rails, spaced parallel shafts extended through the frame and rotatably mounted in side rails thereof, said shafts having ends extended from one side of the frame and said extended ends having screw conveyors thereon, aligned sprockets positioned in the frame and mounted on said shafts, an endless chain trained over the sprockets, and a pulley on one of said shafts and positioned to receive an endless belt of a power source.

2. In an edge aligner for use on a windrower, the combination which comprises a frame, rectangular-shaped in plan having side and end rails and said side and end rails being angle bars, spaced parallel shafts extended through the frame and rotatably mounted in the side rails thereof, said shafts having ends extended from one side of the frame, spiral vanes positioned on the extended ends of the shafts providing screw conveyors, discs on the ends of the shafts extended from the frame positioned at the ends of the vanes adjacent the side rail of the frame and providing shields preventing material being worked into the frame, transmission elements on the shafts whereby one shaft is driven from the other, and a pulley on one of said shafts for receiving an endless belt for driving the shafts.

3. In a windrow aligner for use on a windrower, the combination which comprises an angle iron frame, rectangular-shaped in plan having side and end rails, spaced parallel shafts extended through the frame and rotatably mounted in bearings extended upwardly from the side rails thereof, the shafts being extended from one side of the frame and having spiral vanes providing screw conveyors thereon and having discs at the ends of the vanes adjacent the side rail from which the shafts extend, aligned sprockets positioned in the frame and mounted on the shafts, an endless chain trained over said sprockets, and a pulley mounted on one of said shafts.

References Cited in the file of this patent

UNITED STATES PATENTS

| | | |
|---|---|---|
| 1,954,630 | Livesay | Apr. 10, 1934 |
| 2,484,981 | Coultas | Oct. 18, 1949 |
| 2,700,261 | Scarlett et al. | Jan. 25, 1955 |